US012567510B2

(12) United States Patent　　(10) Patent No.:　US 12,567,510 B2
Momen et al.　　(45) Date of Patent:　　Mar. 3, 2026

(54) STEPWISE CHEMICAL SEPARATION METHODS AND SYSTEMS USING RESIN PACKED COLUMNS

(71) Applicant: SHINE Technologies, LLC, Janesville, WI (US)

(72) Inventors: Abdul Momen, Janesville, WI (US); Marek Piechowicz, Beloit, WI (US); Riley McSweeny, Milton, WI (US)

(73) Assignee: SHINE Technologies, LLC, Janesville, WI (US)

( * ) Notice: Subject to any disclaimer, the term of this patent is extended or adjusted under 35 U.S.C. 154(b) by 708 days.

(21) Appl. No.: 17/737,737

(22) Filed: May 5, 2022

(65) Prior Publication Data

US 2023/0360815 A1　Nov. 9, 2023

(51) Int. Cl.
*G21F 9/12*　(2006.01)
*B01D 15/18*　(2006.01)
*B01D 15/36*　(2006.01)

(52) U.S. Cl.
CPC ........... *G21F 9/12* (2013.01); *B01D 15/1871* (2013.01); *B01D 15/362* (2013.01); *B01D 15/363* (2013.01)

(58) Field of Classification Search
CPC ..... G01F 9/12; B01D 15/1871; B01D 15/362; B01D 15/363
See application file for complete search history.

(56) References Cited

U.S. PATENT DOCUMENTS 4,356,791 A　11/1982　Ward et al.
5,366,636 A　11/1994　Marchin et al.

6,066,302 A　5/2000　Bray
6,165,367 A　12/2000　Partridge
7,597,862 B2　10/2009　Meikrantz et al.
7,727,403 B2　6/2010　Kim et al.
8,148,594 B2　4/2012　Denton et al.
(Continued)

FOREIGN PATENT DOCUMENTS

CN　104835545 B　8/2015
CN　113387412 A　9/2021
JP　2006317290 A　11/2006

OTHER PUBLICATIONS

Clifford, D., "Fundamentals of radium and uranium removal from drinking water supplies", University of Houston. Jan. 19. https://19january2017snapshot.epa.gov/sites/production/files/2015-09/documents/rads_treatment_dennis_clifford.pdf (Year: 2017).*

(Continued)

*Primary Examiner* — Benjamin L Lebron
(74) *Attorney, Agent, or Firm* — Dinsmore & Shohl LLP

(57)　　ABSTRACT

A waste extraction system that includes a column set positioned between and fluidly coupled to an upstream segment of a main waste pathway and a column effluent tank, the column set having a uranium adsorption column fluidly coupled to a supporting adsorption column along the main waste pathway. The uranium adsorption column is upstream the supporting adsorption column. The waste extraction system also includes a strip waste pathway extending from the uranium adsorption column to the column effluent tank bypassing the supporting adsorption column, an anion exchange resin housed in the uranium adsorption column, and a cation exchange resin housed in the supporting adsorption column.

25 Claims, 2 Drawing Sheets

(56) References Cited

U.S. PATENT DOCUMENTS

| | | | |
|---|---|---|---|
| 8,449,850 | B2 | 5/2013 | Glenn et al. |
| 8,822,554 | B2 | 9/2014 | Sochilin |
| 9,336,916 | B2 | 5/2016 | Stevenson |
| 9,865,367 | B2 | 1/2018 | Benard et al. |
| 10,141,079 | B2 | 11/2018 | Czerwinski et al. |
| 11,186,896 | B2 | 11/2021 | Douglas |
| 2003/0194364 | A1 | 10/2003 | Bond et al. |
| 2008/0073276 | A1 | 3/2008 | Hatch et al. |
| 2009/0218289 | A1 | 9/2009 | Brings et al. |
| 2014/0187452 | A1 | 7/2014 | Harrison et al. |
| 2015/0203939 | A1 | 7/2015 | Berry et al. |
| 2018/0166179 | A1 | 6/2018 | Piefer |
| 2021/0077980 | A1 | 3/2021 | Yang et al. |
| 2021/0172042 | A1 * | 6/2021 | Sutterlin ................. C22B 7/007 |

OTHER PUBLICATIONS

Kalin, M., et al, "The removal of uranium from mining waste water using algal/microbial biomass", Journal of Environmental Radioactivity, 78, pp. 151-177. (Year: 2005).*

Purolite, "A500Plus", Internet Archive. https://web.archive.org/web/20161127195437/https://www.purolite.com/product/a500plus. (Year: 2016).*

Purolite, "SSTC60", Internet Archive. https://web.archive.org/web/20210924141351/https://www.purolite.com/product/sstc60 (Year: 2021).*

Gammons, C., et al., "Geochemistry of the rare-earth elements and uranium in the acidic Berkeley Pit lake, Butte, Montana", Chemical Geology, pp. 269-288. (Year: 2003).*

Ang et al., "The effectiveness of ion exchange resins in separating uranium and thorium from rare earth elements in acidic aqueous sulfate media. Part 1. Anionic and cationic resins," Hydrometallurgy 174 (2017), pp. 147-155.

International Search Report of Sep. 21, 2023 for PCT/US23/21122 titled "Stepwise Chemical Separation Methods and Systems Using Resin Packed Columns".

International Search Report of Oct. 24, 2023 for PCT/US23/25203 titled "Metal Ion Separation Technique Using pH Adjustment and Resin Packed Columns".

* cited by examiner

STEPWISE CHEMICAL SEPARATION METHODS AND SYSTEMS USING RESIN PACKED COLUMNS

STATEMENT REGARDING FEDERALLY SPONSORED RESEARCH AND DEVELOPMENT

The present disclosure was developed with Government support under Contract No. DE-NA0004010 awarded by the United States Department of Energy. The Government has certain rights in the present disclosure.

TECHNOLOGY

The present disclosure relates generally to systems and methods for extracting waste radionuclides, for example, waste radionuclides generated in a medical isotope production process.

BACKGROUND

Current techniques for nuclear waste separation include solvent-based extraction, often referred to as solvent extraction or liquid-liquid extraction. Solvent extraction is a separation technique in which an extractant containing organic phase is contacted with a metal-ion containing aqueous phase. Upon mixing, the metal ion is transferred from the aqueous phase into the organic phase. Despite industry reliance, solvent extraction exhibits many drawbacks including challenges associated with phase disengagement, formation of heavy or "third" phases, and the generation of large volumes of hazardous organic waste. Process reliance on hazardous aromatic organic solvents presents a particular challenge from an environmental stewardship standpoint. Many commercial waste haulers have low tolerance for the presence of benzene or other aromatic hydrocarbons in solidified waste.

Accordingly, a need exists for improved methods and systems for nuclear waste separation, for example, in a medical isotope production process.

SUMMARY

According to a first aspect of the present disclosure, a waste extraction system includes a column set positioned between and fluidly coupled to an upstream segment of a main waste pathway and a column effluent tank, the column set includes a uranium adsorption column fluidly coupled to a supporting adsorption column along the main waste pathway, wherein the uranium adsorption column is upstream the supporting adsorption column, a strip waste pathway extending from the uranium adsorption column to the column effluent tank bypassing the supporting adsorption column, an anion exchange resin housed in the uranium adsorption column, and a cation exchange resin housed in the supporting adsorption column.

A second aspect includes the waste extraction system of the first aspect, wherein the supporting adsorption column is a first supporting adsorption column and the column set further includes a second supporting adsorption column downstream the first supporting adsorption column along the main waste pathway, the second supporting adsorption column housing a cation exchange resin.

A third aspect includes the waste extraction system of the first aspect or the second aspect, wherein the uranium adsorption column includes a waste stream input and an elution input each located at a first end of the uranium adsorption column, wherein the waste stream input is fluidly coupled to the upstream segment of the main waste pathway and a waste stream output and an elution output each located at a second end of the uranium adsorption column, wherein the elution output is fluidly coupled to the strip waste pathway.

A fourth aspect includes the waste extraction system of the third aspect, further including an elution pathway extending from an elution acid source to the elution input.

A fifth aspect includes the waste extraction system of the third aspect or the fourth aspect, wherein the first end of the uranium adsorption column is opposite the second end of the uranium adsorption column and the first end of the uranium adsorption column is above the second end of the uranium adsorption column.

A sixth aspect includes the waste extraction system of any of the previous aspects, wherein the supporting adsorption column includes a waste stream input located at a first end of the supporting adsorption column and a waste stream output located at a second end of the uranium adsorption column.

A seventh aspect includes the waste extraction system of the sixth aspect, wherein the first end of the uranium adsorption column is opposite the second end of the uranium adsorption column and the first end of the uranium adsorption column is above the second end of the uranium adsorption column.

An eighth aspect includes the waste extraction system of any of the previous aspects, wherein the cation exchange resin includes cation exchange resin beads, the anion exchange resin includes anion exchange resin beads, the cation exchange resin beads and the anion exchange resin beads are each polymer based and the cation exchange resin beads and the anion exchange resin beads have an average diameter in a range of from 400 $\mu$m to 800 $\mu$m.

According to a ninth aspect of the present disclosure, a method of radionuclide waste extraction includes directing a waste stream from an upstream segment of a main waste pathway into a uranium adsorption column of a column set, wherein the column set further includes a supporting adsorption column fluidly coupled to the uranium adsorption column along the main waste pathway and positioned downstream the uranium adsorption column and a strip waste pathway extends from the uranium adsorption column to a column effluent tank bypassing the supporting adsorption column, adsorbing uranium from the waste stream onto an anion exchange resin housed in the uranium adsorption column, directing the waste stream from the uranium adsorption column into the supporting adsorption column, and adsorbing one or more target radionuclides onto a cation exchange resin housed in the supporting adsorption column.

A tenth aspect includes the method of the ninth aspect, wherein the one or more target radionuclides include strontium-90 and cesium-137.

An eleventh aspect includes the method of the tenth aspect, further including directing the waste stream from the supporting adsorption column to the column effluent tank, wherein the waste stream entering the column effluent tank includes less than 0.04 curies per cubic meter of strontium-90 and less than 1 curie per cubic meter of cesium-137.

A twelfth aspect includes the method of the tenth aspect or the eleventh aspect, wherein the waste stream in the upstream segment of the main waste pathway comprises a gram/liter level of uranium that is at least 500 times greater than a gram/liter level of both strontium-90 and cesium-137.

A thirteenth aspect includes the method of any of the ninth through twelfth aspects, wherein the one or more target radionuclides include barium, cerium, cesium, lanthanum, molybdenum, sodium, neodymium, palladium, praseodymium, rubidium, rhodium, ruthenium, samarium, strontium, yttrium, zirconium, protactinium, or a combination thereof.

A fourteenth aspect includes the method of any of the ninth through thirteenth aspects, wherein the anion exchange resin housed in the uranium adsorption column adsorbs 90% or more of the uranium present in the waste stream.

A fifteenth aspect includes the method of any of the ninth through fourteenth aspects, wherein the waste stream in the upstream segment of the main waste pathway includes 1 gram/liter of uranium or greater.

A sixteenth aspect includes the method of any of the ninth through fifteenth aspects, wherein the cation exchange resin housed in the supporting adsorption column adsorbs 90% or more of the one or more target radionuclides present in the waste stream.

A seventeenth aspect includes the method of any of the ninth through sixteenth aspects, wherein the supporting adsorption column is a first supporting adsorption column and the column set further includes a second supporting adsorption column downstream the first supporting adsorption column along the main waste pathway, the second supporting adsorption column housing a cation exchange resin.

An eighteenth aspect includes the method of the seventeenth aspect, wherein the first supporting adsorption column and the second supporting adsorption column collectively adsorb 99% or more of the one or more target radionuclides present in the waste stream.

A nineteenth aspect includes the method of any of the ninth through eighteenth aspects, further including directing an elution acid into the uranium adsorption column to desorb uranium from the anion exchange resin, forming a uranium waste stream, and directing the uranium waste stream to the column effluent tank along the strip waste pathway.

A twentieth aspect includes the method of any of the ninth through nineteenth aspects, wherein the cation exchange resin includes cation exchange resin beads, the anion exchange resin includes anion exchange resin beads, the cation exchange resin beads and the anion exchange resin beads are each polymer based, and the cation exchange resin beads and the anion exchange resin beads have an average diameter in a range of from 400 μm to 800 μm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
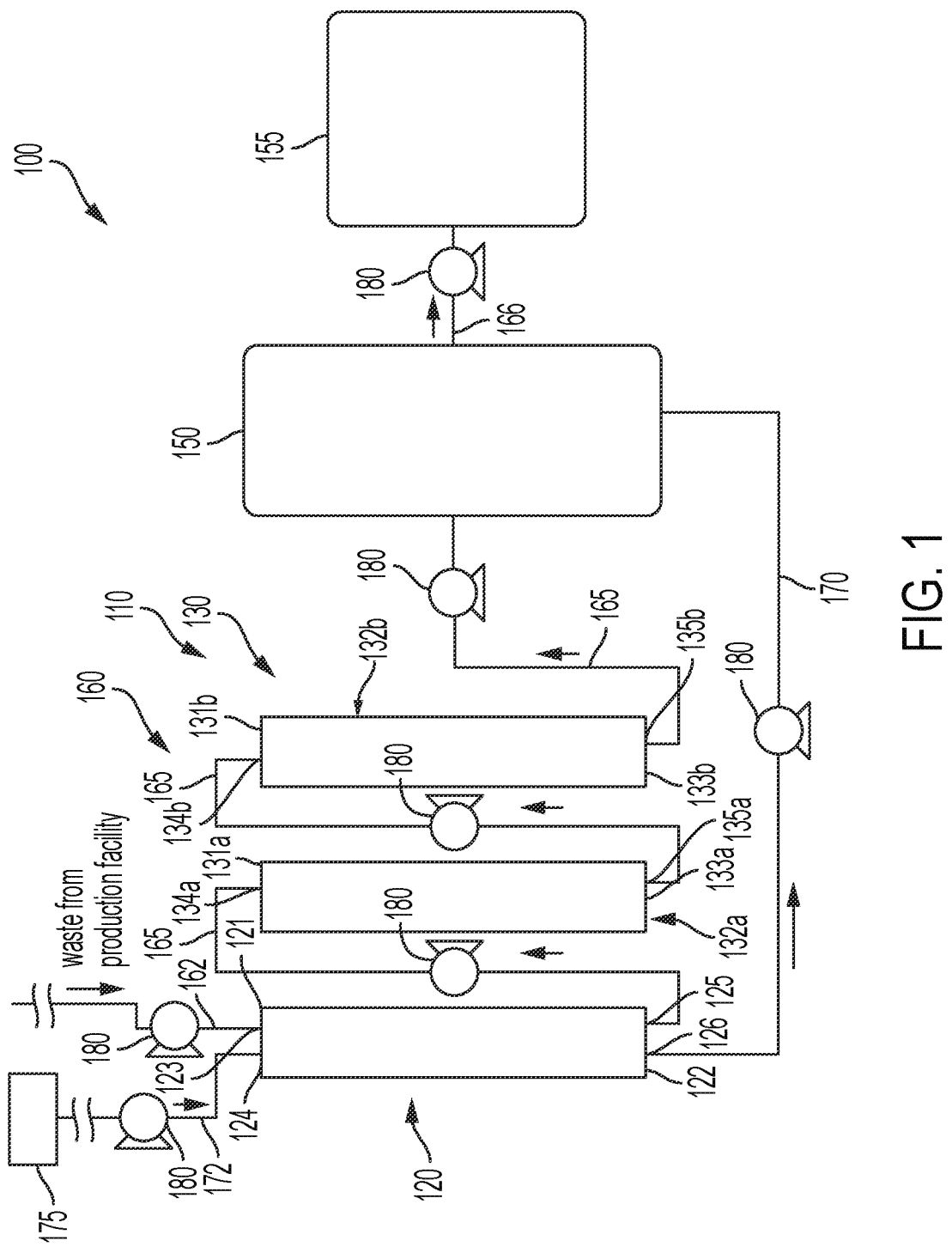
FIG. 1 schematically depicts a waste extraction system, according to one or more embodiments shown and described herein.

Referring generally to the figures, embodiments of the present disclosure are directed to waste extraction systems and methods for stepwise removal of target waste radionuclides from a waste stream, for example, from a waste stream formed during a medical isotope production process. The waste stream includes multiple radionuclides, such as uranium-235 (U-235), cesium-137 (Cs-137), and strontium-90 (Sr-90). The waste extraction system includes a column set of adsorption columns that house ion exchange resins configured to selectively adsorb certain radionuclides. The column set is fluidly coupled to a main waste pathway such that the waste stream passes through the column set and reaches a column effluent tank for final processing.

The column set includes a uranium adsorption column housing an anion exchange resin configured to selectively adsorb uranium and one or more supporting adsorption columns positioned downstream the uranium adsorption column along a main waste pathway. The one or more supporting adsorption columns house a cation exchange resin configured to selectively adsorb one or more target radionuclides, such as Cs-137 and Sr-90. The waste extraction system also includes a waste strip pathway that fluidly couples the uranium adsorption column to a column effluent tank, bypassing the one or more supporting adsorption columns. The uranium adsorption column provides a way to remove uranium, such as U-235, from the waste stream, such that the waste stream that passes through the one or more supporting adsorption columns comprises minimal uranium. This allows the one or more supporting adsorption columns to remove other target radionuclides from the waste stream, such as Cs-137 and Sr-90, which may be present in lower quantities in the initial waste stream than uranium. Embodiments of the waste extraction system and methods of radionuclide waste extraction using the waste extraction system will now be described and, whenever possible, the same reference numerals will be used throughout the drawings to refer to the same or like parts.

Figure 2:
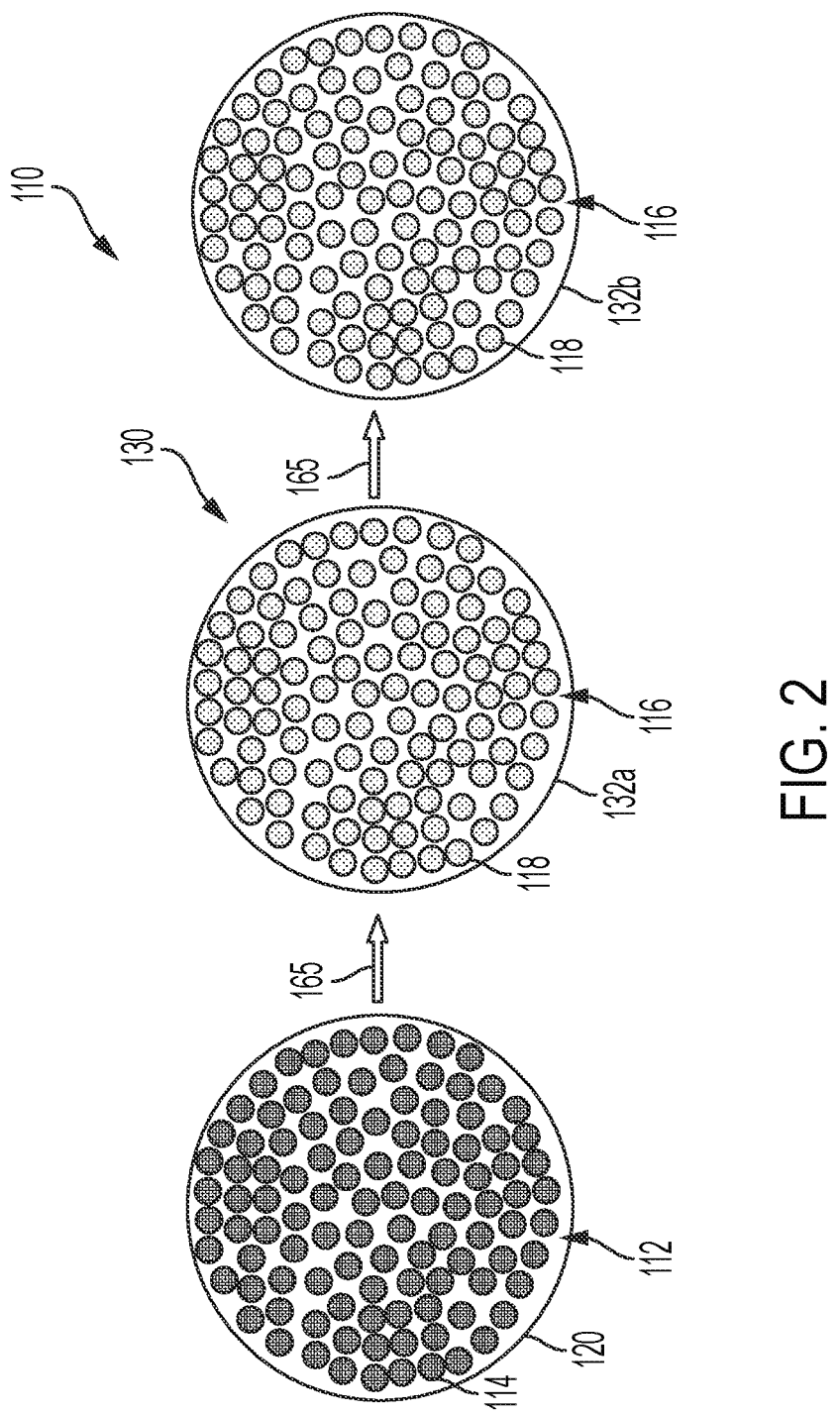
FIG. 2 schematically depicts ion exchange resin housed in adsorption columns of a column set of the waste production system of FIG. 1, according to one or more embodiments shown and described herein.

Referring now to FIGS. 1 and 2, a waste extraction system 100 is shown, according to an illustrative embodiment. The waste extraction system 100 comprises a column set 110 comprising two or more adsorption columns packed with ion exchange resins configured to adsorb radionuclides. The column set 110 includes a uranium adsorption column 120 housing anion exchange resins 112 and one or more supporting adsorption columns 130 housing cation exchange resins 116. The column set 110 is fluidly coupled to a main waste pathway 160, which comprises one or more pipes, tubes, or other fluid transport mechanisms for facilitating flow of a waste stream from a production facility, through the column set 110, to a column effluent tank 150, and ultimately to a waste tank 155. One or more pumps 180 are coupled to the main waste pathways 160 to help generate fluid flow within the main waste pathway 160. In one example operation, an upstream segment 162 of the main waste pathway 160 fluidly couples the waste extraction system 100 with a production region of a medical isotope production facility and the waste stream comprises radionuclide waste generated by a medical isotope production process.

The column set 110 is positioned between and fluidly coupled to the upstream segment 162 of the main waste pathway 160 and the column effluent tank 150. In operation, a waste stream comprising radionuclide waste enters the waste extraction system 100 along the upstream segment 162 of the main waste pathway 160 (e.g., an initial waste stream). The uranium adsorption column 120 is fluidly coupled to the upstream segment 162 of the main waste pathway 160 and positioned upstream the one or more supporting adsorption columns 130 along the main waste pathway 160. In operation, the waste stream traverses the uranium adsorption column 120 and thereafter traverses the one or more supporting adsorption columns 130 along the main waste pathway 160. In operation, the anion exchange resin 112 housed in the uranium adsorption column 120 adsorbs uranium, such as U-235, from the waste stream, reducing the uranium in the waste stream that enters the one or more supporting adsorption columns 130. The cation exchange resin 116 housed in the one or more supporting adsorption columns 130 then adsorbs one or more target radionuclides from the waste stream, such as Cs-137 and Sr-90.

By removing uranium from the waste stream at the uranium adsorption column 120, the one or more supporting adsorption columns 130 may adsorb other target radionuclides more efficiently and effectively. Without intending to be limited by theory, the uranium present in the initial waste stream would be adsorbed by the cation exchange resins 116 in the supporting adsorption columns 130 (together with the one or more target radionuclides) and the large relative amount of uranium could cause the cation exchange resin 116 to reach its adsorption limit before removing the desired amounts of the target radionuclides. For example, the initial waste stream may comprise a gram/liter level of uranium that is at least 500 times greater than a gram/liter level of both strontium-90 and cesium-137, for example, at least 750 times greater, at least 1000 times greater, at least 1250 times greater, at least 1500 times greater, at least 2000 times greater, or a multiplier in a range having any two of these values as endpoints. In some embodiments, the initial waste stream may comprise a gram/liter level of uranium that is at least 500 times greater than a gram/liter level of any individual of the following radionuclides, barium, cerium, lanthanum, molybdenum, neodymium, palladium, praseodymium, rubidium, rhodium, ruthenium, samarium, yttrium, and zirconium, for example, at least 750 times greater, at least 1000 times greater, at least 1250 times greater, at least 1500 times greater, at least 2000 times greater, or a multiplier in a range having any two of these values as endpoints. Moreover, uranium may comprise from 40% to 60% of the total radionuclides in the initial waste stream by mass.

In some embodiments, the initial waste stream comprises 1 gram/liter of uranium or greater, such as 1.5 gram/liter, 2 gram/liter or greater, 2.5 gram/liter or greater 3 gram/liter or greater, and values in a range having two of these values as endpoints. While Cs-137 and Sr-90 are referred to as the target radionuclides in the embodiments described herein, other target radionuclides may be present in the waste stream and adsorbed by the cation exchange resin 116. For example, other target radionuclides that may be present in the waste stream and may be adsorbed by the cation exchange resin 116 comprise barium, cerium, cesium, lanthanum, molybdenum, sodium, neodymium, palladium, praseodymium, rubidium, rhodium, ruthenium, samarium, strontium, yttrium, zirconium, protactinium, or a combination thereof.

The uranium adsorption column 120 comprises a waste stream input 123 and an elution input 124 each located at a first end 121 of the uranium adsorption column 120 and a waste stream output 125 and an elution output 126 each located at a second end 122 of the uranium adsorption column 120. The waste stream input 123 is fluidly coupled to the upstream segment 162 of the main waste pathway 160 and the waste stream output 125 is fluidly coupled to an inter-column segment 165 of the main waste pathway 160. The main waste pathway 160 may comprise multiple inter-column segments 165, which are the segments of the main waste pathway 160 between adjacent adsorption column of the column set 110 and between the final adsorption column (e.g., the second supporting adsorption column 132b in the embodiment depicted in FIG. 1) and the column effluent tank 150. It should be understood that additional inter-column segments 165 are contemplated in embodiments comprising processing components between the column set 110 and the column effluent tank 150. Moreover, in some embodiments, the first end 121 of the uranium adsorption column 120 is opposite the second end 122 of the uranium adsorption column 120 and the first end 121 of the uranium adsorption column 120 is above the second end 122 of the uranium adsorption column 120. This orientation facilitates gravity assisted flow of the waste stream through the uranium adsorption column 120. Gravity assisted flow may reduce the pumping pressure and pumping power needed to flow the waste stream through the uranium adsorption column 120. Gravity assisted flow may also maximize contact between the anion exchange resin 112 and the waste stream, maximizing uranium adsorption.

In the embodiment depicted in FIG. 1, the one or more supporting adsorption columns 130 comprise a first supporting adsorption column 132a and a second supporting adsorption column 132b fluidly coupled along the main waste pathway 160, for example, by an inter-column segment 165 of the main waste pathway 160. The second supporting adsorption column 132b is positioned downstream the first supporting adsorption column 132a such that the waste stream traverses the first supporting adsorption column 132a before traversing the second supporting adsorption column 132b. Each supporting adsorption column 132a, 132b comprises a waste stream input 134a, 134b and a waste stream output 135a, 135b. The waste stream input 134a, 134b is located at the first end 131a, 131b of each supporting adsorption column 132a, 132b and the waste stream output 135a, 135b is located at the second end 133a, 133b of each supporting adsorption column 132a, 132b. Moreover, in some embodiments, the first end 131a, 131b of each supporting adsorption column 132a, 132b column is opposite the second end 133a, 133b, and the first end 131a, 131b of the is above the second end 133a, 133b. This orientation facilitates gravity assisted flow of the waste stream through each supporting adsorption column 132a, 132b column. Gravity assisted flow may reduce the pumping pressure and pumping power needed to flow the waste stream through the one or more supporting adsorption columns 130. Gravity assisted flow may also maximize contact between the cation exchange resin 116 and the waste stream, maximizing target radionuclide adsorption.

While two supporting adsorption columns 132a, 132b are depicted, it should be understood that additional adsorption columns could be included to adsorb additional amounts of target radionuclides. Alternatively, column sets 110 are contemplated that have just the first supporting adsorption column 132a and exclude the second supporting adsorption column 132b. Indeed, in such alternative embodiments, the volume of the first supporting adsorption column 132a may be doubled (with a concomitant doubling of the volume of the cation exchange resin 116 in the first supporting adsorption column 132a). While this would facilitate similar levels of target radionuclide removal, doubling the volume of the first supporting adsorption column 132a may be difficult in waste extraction systems 100 having size and design constraints. Moreover, by increasing the volume of the first supporting adsorption column 132a, the pumping pressure for flowing the waste stream through the first supporting adsorption column 132a increases because flow resistance increases as the size of the first supporting adsorption column 132a increases.

Referring still to FIG. 1, the elution input 124 of the uranium adsorption column 120 is fluidly coupled to an elution pathway 172 extending from an elution acid source 175 to the elution input 124. The elution output 126 is fluidly coupled to a strip waste pathway 170, which extends from the uranium adsorption column 120 to the column effluent tank 150 and provides a fluid pathway from the uranium adsorption column 120 to the column effluent tank 150 while bypassing the one or more supporting adsorption columns 130. One or more of the pumps 180 may be fluidly coupled to the strip waste pathway 170 to help facilitate fluid flow in the strip waste pathway 170. The strip waste pathway 170 provides a pathway for uranium removed from the initial waste stream by the uranium adsorption column 120 (e.g., a uranium waste stream) to reach the column effluent tank 150 without traversing the one or more supporting adsorption columns 130.

In operation, an elution acid may be directed into the uranium adsorption column 120 through the elution input 124. The elution acid flows through the uranium adsorption column 120 and desorbs uranium from the anion exchange resin 112, forming a uranium waste stream. The uranium waste stream may be directed from the uranium adsorption column 120 through the elution output 126, into the strip waste pathway 170, where the uranium waste stream is directed to the column effluent tank 150. By flowing through the strip waste pathway 170, the uranium waste stream bypasses the one or more supporting adsorption columns 130, allowing the supporting adsorption columns 130 to adsorb other target radionuclides that are present in the initial waste stream at lower levels than the uranium, such as Cs-137 and Sr-90.

As shown in FIG. 1, the column effluent tank 150 is fluidly coupled to both the main waste pathway 160 and the strip waste pathway 170. Thus, the treated waste stream from the supporting adsorption columns 130 mixes with the uranium waste stream from the uranium adsorption column 120 in the column effluent tank 150 to form resultant waste. A waste tank 155 is fluidly coupled to the column effluent tank 150 by a waste tank segment 166 of the main waste pathway 160. Resultant waste in the column effluent tank 150 may be directed into the waste tank 155 along the waste tank segment 166 for final treatment and removal off-site. This final treatment may comprise solidifying the resultant waste with concrete, to form solidified, final waste, which may occur in the waste tank 155. In some embodiments, the column effluent tank 150 and the waste tank 155 are the same volume, for example, a volume in a range of from 25 gallons to 75 gallons, such as 50 gallons. In other embodiments, the column effluent tank 150 and the waste tank 155 are different volumes and may comprise volumes in a range of from 25 gallons to 75 gallons.

While the resultant waste contains the earlier separated uranium, the target radionuclides remain removed. By removing target radionuclides using the waste extraction system 100, the resultant waste comprises lower levels of radioactivity than the initial waste stream. Indeed, the target radionuclides contribute a disproportionate amount of the total radioactivity in the initial waste stream. For example, Cs-137 is a gamma emitting nuclide and thus, it is desirable to minimize the amount of the Cs-137 in the resultant waste. Adsorbing the target radionuclides, such as Cs-137 and Sr-90, allows these target radionuclides disposed separately from the resultant waste, for example in a minimized volume that is sealed in concrete.

Referring now to FIG. 2, a schematic, cross sectional view of the column set 110 is depicted. As depicted in FIG. 2, in some embodiments, the anion exchange resin 112 comprises a plurality of anion exchange resin beads 114 and the cation exchange resin 116 comprises cation exchange resin beads 118. The anion exchange resin beads 114 and the cation exchange resin beads 118 comprise an average diameter in a range of from 200 μm to 1000 μm, for example, in a range of from 400 μm to 800 μm, such as 400 μm, 425 μm, 450 μm, 475 μm, 500 μm, 525 μm, 550 μm, 575 μm, 600 μm, 625 μm, 650 μm, 675 μm, 700 μm, 725 μm, 750 μm, 775 μm, 800 μm or any range having any two of these values as endpoints.

In some embodiments, the plurality of the anion exchange resin beads 114 and the cation exchange resin beads 118 are dry poured into the adsorption columns of the column set 110. Once in the supporting adsorption columns 132, the anion exchange resin beads 114 and the cation exchange resin beads 118 may be pre-conditioned by passing two or more column volumes of pre-treatment acid, such as sulfuric acid, through the adsorption columns of the column set 110 before introducing the waste stream to the column set 110. In other embodiments, the anion exchange resin beads 114 and the cation exchange resin beads 118, may be pre-treated with an acid, such as sulfuric acid, and added to the column set 110 as a resin slurry (e.g., a resin in acid). The pre-treatment acid comprises a pH that is similar to (e.g., within 1 unit of) the initial waste stream. For example, the pre-treatment acid may comprise sulfuric acid, which has a pH of 1. Pre-treating the anion exchange resin beads 114 and the cation exchange resin beads 118 may be performed at a location away from the waste stream, such as a different location within the waste extraction system 100 or a different location within the medical isotope production facility. Thus, personnel performing this pre-treatment may be located away from the radionuclide containing waste stream.

In some embodiments, the anion exchange resin 112 and the cation exchange resin 116 are each polymer based. The anion exchange resin 112 may comprise a weak base anion exchange resin or a strong base anion exchange resin. The cation exchange resin 116 may comprise a strong acid cation exchange resin. The anion exchange resin 112 and the cation exchange resin 116 have a combination of porosity, which contributes to the adsorption capacity, and chemical functionality, which contributes to selectivity. Moreover, the cation exchange resin 116 has a preference for adsorption of Cs-137 and Sr-90 compared to uranium and thus the cation exchange resin 116 is effective in the supporting adsorption columns 130. Example anion exchange resins 112 include Amberlite™ resin and DIAON™ resin. Example cation exchange resins 116 include SACMP (Strong Acid Cation Macroporous Polystyrene) resin (such as ResinTech® SACMP, manufactured by ResinTech Inc.) and AMP-PAN (Ammonium Molybophosphate Polyacrylonitrile) resin.

In some embodiments, the cation exchange resin 116 comprises an adsorption capacity of Cs-137 in a range of from 100 mg of Cs-137 per gram of the cation exchange resin 116 (i.e., 100 mg/g) to 200 mg/g, such as from 125 mg/g to 175 mg/g, for example, 105 mg/g, 110 mg/g, 115 mg/g, 120 mg/g, 125 mg/g, 130 mg/g, 135 mg/g, 140 mg/g, 145 mg/g, 150 mg/g, 153 mg/g, 155 mg/g, 157 mg/g, 160 mg/g, 165 mg/g, 170 mg/g, 175 mg/g, 180 mg/g, 185 mg/g, 190 mg/g, 195 mg/g, 200 mg/g, or a value in a range having any two of these numbers as endpoints. In some embodiments, the cation exchange resin 116 comprises an adsorption capacity of Sr-90 in a range of from 0.1 mg of Sr-90 per gram of the cation exchange resin 116 (i.e., 0.1 mg/g) to 1 mg/g, such as from 0.15 mg/g to 0.5 mg/g, for example 0.15 mg/g, 0.2 mg/g, 0.25 mg/g, 0.3 mg/g, 0.35 mg/g, 0.4 mg/g, 0.45 mg/g, 0.5 mg/g, 0.55 mg/g, 0.6 mg/g, 0.65 mg/g, 0.7 mg/g, 0.75 mg/g, 0.8 mg/g, 0.85 mg/g, 0.9 mg/g, 0.95 mg/g, 1 mg/g, or a value in a range having any two of these numbers as endpoints. Furthermore, in some embodiments, the anion exchange resin 112 comprises an adsorption capacity of uranium (e.g., U-235) in a range of from 85 mg of U per gram of the anion exchange resin 112 (i.e., 85 mg/g) to 165 mg/g, such as from 115 mg/g to 140 mg/g, for example, 85 mg/g, 90 mg/g, 95 mg/g, 100 mg/g, 105 mg/g, 110 mg/g, 115 mg/g, 120 mg/g, 125 mg/g, 130 mg/g, 135 mg/g, 140 mg/g, 145 mg/g, 150 mg/g, 155 mg/g, 160 mg/g, 165 mg/g, or a value in a range having any two of these numbers as endpoints.

Referring again to FIGS. 1 and 2, a method of radionuclide waste extraction using the waste extraction system 100 will now be described. First, the method comprises directing a waste stream from the upstream segment 162 of the main waste pathway 160 into the uranium adsorption column 120 of the column set 110. Next, the method comprises adsorbing uranium from the waste stream onto the anion exchange resin 112 housed in the uranium adsorption column 120. In operation, the waste stream enters the uranium adsorption column 120 through the waste stream input 123, the anion exchange resin 112 housed in the uranium adsorption column 120 adsorbs uranium present in the waste stream, removing this uranium from the waste stream. The waste stream then exits the uranium adsorption column 120 though the waste stream output 125 and flows to the one or more supporting adsorption columns 130 with lower levels of uranium than was present in the waste stream upon entry into the uranium adsorption column 120. For example, the anion exchange resin 112 housed in the uranium adsorption column 120 adsorbs 85% or more of the uranium present in the waste stream, for example, 86% or more, 87% or more, 88% or more, 89% or more, 90% or more, 91% or more, 92% or more, 93% or more, 94% or more, 95% or more, 96% or more, 97% or more, 98% or more, 99% or more, or a value in a range having any two of these numbers as endpoints.

Next, the method comprises directing the waste stream (e.g., the reduced uranium waste stream) from the uranium adsorption column 120 into the first supporting adsorption column 132a, for example, along an inter-column segment 165. In operation, the waste stream (e.g., the reduced uranium waste stream) enters the first supporting adsorption column 132a through the waste stream input 134a, and the cation exchange resin 116 housed in the first supporting adsorption column 132a adsorbs target radionuclides, such as Sr-90 and Cs-137, present in the reduced uranium waste stream. In operation, the cation exchange resin 116 housed in the first supporting adsorption column 132a adsorbs 85% or more of the one or more target radionuclides initially present in the waste stream (e.g., present in the waste stream in the upstream segment 162 of the main waste pathway 160), for example, 85% or more of the strontium-90 and cesium-137 present in the waste stream, such as 86% or more, 87% or more, 88% or more, 89% or more, 90% or more, 91% or more, 92% or more, 93% or more, 94% or more, 95% or more, 96% or more, or a value in a range having any two of these numbers as endpoints.

The reduced uranium waste stream then exits the first supporting adsorption column 132a though the waste stream output 135a into an inter-column segment 165 of the main waste pathway 160. After exiting the first supporting adsorption column 132a, the waste stream may be directed to either the second supporting adsorption column 132b (e.g., in embodiments comprising two or more supporting adsorption columns 130, such as the embodiments depicted in FIG. 1) or the column effluent tank 150 (e.g., in embodiments comprising a single supporting adsorption column 130). In embodiments comprising the second supporting adsorption column 132b, once the reduced uranium waste stream enters the second supporting adsorption column 132b, the method comprises adsorbing additional amounts of the one or more target radionuclides present in the reduced uranium waste stream onto the cation exchange resin 116 housed in the second supporting adsorption column 132b. By adsorbing additional amounts of target radionuclides in the second supporting adsorption column 132b, the first supporting adsorption column 132a and the second supporting adsorption column 132b collectively adsorb 95% or more of the one or more target radionuclides initially present in the waste stream (e.g., present in the waste stream in the upstream segment 162 of the main waste pathway 160), for example, 95% or more of the Sr-90 and Cs-137 present in the waste stream, such as 96% or more, 97% or more, 98% or more, 98.5% or more, 99% or more, 99.5% or more, 99.9% or more, or a value in a range having any two of these numbers as endpoints. Indeed, the first supporting adsorption column 132a operates as a rough filter of target radionuclides and the second supporting adsorption column 132b operates as a fine filter of the target radionuclides.

Referring still to FIGS. 1 and 2, the method further comprises removing uranium from the uranium adsorption column 120 and directing the uranium to the column effluent tank 150 along the strip waste pathway 170. This removal process may comprise directing an elution acid, such as sulfuric acid, into the uranium adsorption column 120 to desorb uranium from the anion exchange resin 112, forming a uranium waste stream. The elution acid may comprise sulfuric acid. The elution acid may be directed from the elution acid source 175 along the elution pathway 172 and into the uranium adsorption column 120 through the elution input 124. One or more of the pumps 180 may be fluidly coupled to the elution pathway 172 to help facilitate flow of the elution acid in the elution pathway 172 and into the uranium adsorption column 120. After desorption, the uranium waste stream may be directed from the uranium adsorption column 120 to the column effluent tank 150 along the strip waste pathway 170. At the column effluent tank 150, the treated waste stream from the one or more supporting adsorption columns 130 mixes with the uranium waste stream from the uranium adsorption column 120 to form resultant waste. In some embodiments, the method further comprises directing the resultant waste to the waste tank 155 along the waste tank segment 166 for final treatment and removal off-site.

As noted above, the final treatment of the resultant waste may be solidified with concrete, to form solidified, final waste. This densifies the resultant waste. Thus, the final waste comprises a higher level of curies per cubic meter than the resultant waste used to form the final waste. However, the methods of radionuclide waste extraction using the waste extraction system 100 described herein, are effective at remove large portions of target radionuclides such that, even after densification, the final waste formed from the resultant waste retain low levels of radioactivity. For example, the resultant waste may comprise less than 0.25 curies per cubic meter of Sr-90, for example, less than 0.2 curies per cubic meter, less than 0.15 curies per cubic meter, less than 0.1 curies per cubic meter, less than 0.08 curies per cubic meter, less than 0.06 curies per cubic meter, less than 0.05 curies per cubic meter, less than 0.04 curies per cubic meter, less than 0.03 curies per cubic meter, less than 0.02 curies per cubic meter, less than 0.01 curies per cubic meter, or any value in a range having any two of these values as endpoints. The resultant waste may also comprise less than 10 curies per cubic meter of Cs-137, for example, less than 8 curies per cubic meter, less than 6 curies per cubic meter, less than 5 curies per cubic meter, less than 4 curies per cubic meter, less than 2 curies per cubic meter, less than 1 curie per cubic meter, less than 0.75 curies per cubic meter, less than 0.5 curies per cubic meter, less than 0.25 curies per cubic meter, less than 0.1 curies per cubic meter, or any value in a range having any two of these values as endpoints. In some embodiments, the resultant waste comprises less than 0.04 curies per cubic meter of Sr-90 and less than 1 curie per cubic meter of Cs-137. In some embodiments, the final, densified waste comprises less than 0.04 curies per cubic meter of Sr-90 and less than 1 curie per cubic meter of Cs-137.

Moreover, the above values of curies per cubic meter in the resultant waste may be achieved using the waste extraction system 100 described herein in embodiments in which the initial waste stream (that is, the waste stream traversing the upstream segment 162 of the main waste pathway 160) comprises greater than 150 curies per cubic meter of Sr-90, for example, greater than 200 curies per cubic meter, greater than 300 curies per cubic meter, greater than 300 curies per cubic meter, greater than 300 curies per cubic meter, greater than 500 curies per cubic meter, greater than 1000 curies per cubic meter, greater than 2500 curies per cubic meter, greater than 5000 curies per cubic meter, or any value in a range having any two of these values as endpoints, and comprises greater than 44 curies per cubic meter of Cs-137, for example, greater than 50 curies per cubic meter, greater than 100 curies per cubic meter, greater than 250 curies per cubic meter, greater than 500 curies per cubic meter, greater than 800 curies per cubic meter, greater than 1000 curies per cubic meter, greater than 1500 curies per cubic meter, greater than 2000 curies per cubic meter, greater than 3500 curies per cubic meter, or any value in a range having any two of these values as endpoints.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, optical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of radionuclide waste extraction, the method comprising:

directing a waste stream from an upstream segment of a main waste pathway into a uranium adsorption column of a column set, wherein:

the column set further comprises a supporting adsorption column fluidly coupled to the uranium adsorption column along the main waste pathway and positioned downstream the uranium adsorption column; and a strip waste pathway extends from the uranium adsorption column to a column effluent tank bypassing the supporting adsorption column;

adsorbing uranium from the waste stream onto an anion exchange resin housed in the uranium adsorption column;

directing the waste stream from the uranium adsorption column into the supporting adsorption column; and adsorbing one or more target radionuclides onto a cation exchange resin housed in the supporting adsorption column, wherein the one or more target radionuclides comprise strontium-90 and cesium-137 and are present in the waste stream at lower quantities than uranium.

2. The method of claim 1, further comprising directing the waste stream from the supporting adsorption column to the column effluent tank, wherein the waste stream entering the column effluent tank comprises less than 0.04 curies per cubic meter of strontium-90 and less than 1 curie per cubic meter of cesium-137.

3. The method of claim 1, wherein the waste stream in the upstream segment of the main waste pathway comprises a gram/liter level of uranium that is at least 500 times greater than a gram/liter level of both strontium-90 and cesium-137.

4. The method of claim 1, wherein the one or more target radionuclides further comprise barium, cerium, lanthanum, molybdenum, sodium, neodymium, palladium, praseodymium, rubidium, rhodium, ruthenium, samarium, yttrium, zirconium, protactinium, or a combination thereof.

5. The method of claim 1, wherein the anion exchange resin housed in the uranium adsorption column adsorbs 90% or more of the uranium present in the waste stream.

6. The method of claim 1, wherein the waste stream in the upstream segment of the main waste pathway comprises 1 gram/liter of uranium or greater.

7. The method of claim 1, wherein the cation exchange resin housed in the supporting adsorption column adsorbs 90% or more of the one or more target radionuclides present in the waste stream.

8. The method of claim 1, wherein the supporting adsorption column is a first supporting adsorption column and the column set further comprises a second supporting adsorption column downstream the first supporting adsorption column along the main waste pathway, the second supporting adsorption column housing a cation exchange resin.

9. The method of claim 8, wherein the first supporting adsorption column and the second supporting adsorption column collectively adsorb 99% or more of the one or more target radionuclides present in the waste stream.

10. The method of claim 1, further comprising:
directing an elution acid into the uranium adsorption column to desorb uranium from the anion exchange resin, forming a uranium waste stream; and
directing the uranium waste stream to the column effluent tank along the strip waste pathway.

11. The method of claim 1, wherein:
the cation exchange resin comprises cation exchange resin beads;
the anion exchange resin comprises anion exchange resin beads;
the cation exchange resin beads and the anion exchange resin beads are each polymer based; and
the cation exchange resin beads and the anion exchange resin beads have an average diameter in a range of from 400 μm to 800 μm.

12. The method of claim 1, wherein uranium comprises from 40% to 60% of total radionuclides in the waste stream.

13. The method of claim 1, wherein a gram/liter level of uranium in the waste steam is at least 500 times greater than a gram/liter level of strontium-90 and cesium-137.

14. A method of radionuclide waste extraction, the method comprising:
directing a waste stream from an upstream segment of a main waste pathway into a uranium adsorption column of a column set, wherein:
the waste stream in the upstream segment of the main waste pathway comprises 1 gram/liter of uranium or greater;

the column set further comprises a supporting adsorption column fluidly coupled to the uranium adsorption column along the main waste pathway and positioned downstream the uranium adsorption column; and
a strip waste pathway extends from the uranium adsorption column to a column effluent tank bypassing the supporting adsorption column;
adsorbing uranium from the waste stream onto an anion exchange resin housed in the uranium adsorption column;
directing the waste stream from the uranium adsorption column into the supporting adsorption column; and
adsorbing one or more target radionuclides onto a cation exchange resin housed in the supporting adsorption column,
wherein the target radionuclides are present in the waste stream at lower quantities than uranium.

15. The method of claim 14, wherein the one or more target radionuclides comprise strontium-90 and cesium-137.

16. The method of claim 14, further comprising:
directing an elution acid into the uranium adsorption column to desorb uranium from the anion exchange resin, forming a uranium waste stream; and
directing the uranium waste stream to the column effluent tank along the strip waste pathway.

17. A method of radionuclide waste extraction, the method comprising:
directing a waste stream from an upstream segment of a main waste pathway into a uranium adsorption column of a column set, wherein:
the column set further comprises a supporting adsorption column fluidly coupled to the uranium adsorption column along the main waste pathway and positioned downstream the uranium adsorption column; and
a strip waste pathway extends from the uranium adsorption column to a column effluent tank bypassing the supporting adsorption column;
adsorbing uranium from the waste stream onto an anion exchange resin housed in the uranium adsorption column;
directing the waste stream from the uranium adsorption column into the supporting adsorption column;
adsorbing one or more target radionuclides onto a cation exchange resin housed in the supporting adsorption column,
directing an elution acid into the uranium adsorption column to desorb uranium from the anion exchange resin, forming a uranium waste stream; and
directing the uranium waste stream to the column effluent tank along the strip waste pathway,
wherein the target radionuclides are present in the waste stream at lower quantities than uranium.

18. The method of claim 17, wherein the one or more target radionuclides comprise barium, cerium, cesium, lanthanum, molybdenum, sodium, neodymium, palladium, praseodymium, rubidium, rhodium, ruthenium, samarium, strontium, yttrium, zirconium, protactinium, or a combination thereof.

19. The method of claim 17, wherein the one or more target radionuclides comprise strontium-90 and cesium-137.

20. A method of radionuclide waste extraction, the method comprising:
directing a waste stream from an upstream segment of a main waste pathway into a uranium adsorption column of a column set, wherein:

uranium comprises from 40% to 60% of total radionu-
clides in the waste stream;

the column set further comprises a supporting adsorp-
tion column fluidly coupled to the uranium adsorp-
tion column along the main waste pathway and
positioned downstream the uranium adsorption col-
umn; and a strip waste pathway extends from the uranium
adsorption column to a column effluent tank bypass-
ing the supporting adsorption column;

adsorbing uranium from the waste stream onto an anion
exchange resin housed in the uranium adsorption col-
umn;

directing the waste stream from the uranium adsorption
column into the supporting adsorption column; and adsorbing one or more target radionuclides onto a cation
exchange resin housed in the supporting adsorption
column, wherein the target radionuclides are present in the waste
stream at lower quantities than uranium.

21. The method of claim 20, wherein the one or more
target radionuclides comprise strontium-90 and cesium-137.

22. The method of claim 20, further comprising:

directing an elution acid into the uranium adsorption
column to desorb uranium from the anion exchange
resin, forming a uranium waste stream; and directing the uranium waste stream to the column effluent
tank along the strip waste pathway.

23. A method of radionuclide waste extraction, the
method comprising:

directing a waste stream from an upstream segment of a
main waste pathway into a uranium adsorption column
of a column set, wherein:

a gram/liter level of uranium in the waste steam is at
least 500 times greater than a gram/liter level of
strontium-90 and cesium-137 the column set further comprises a supporting adsorp-
tion column fluidly coupled to the uranium adsorp-
tion column along the main waste pathway and
positioned downstream the uranium adsorption col-
umn; and a strip waste pathway extends from the uranium
adsorption column to a column effluent tank bypass-
ing the supporting adsorption column;

adsorbing uranium from the waste stream onto an anion
exchange resin housed in the uranium adsorption col-
umn;

directing the waste stream from the uranium adsorption
column into the supporting adsorption column; and adsorbing one or more target radionuclides onto a cation
exchange resin housed in the supporting adsorption
column, wherein the target radionuclides are present in the waste
stream at lower quantities than uranium.

24. The method of claim 23, wherein the one or more
target radionuclides comprise strontium-90 and cesium-137.

25. The method of claim 23, further comprising:

directing an elution acid into the uranium adsorption
column to desorb uranium from the anion exchange
resin, forming a uranium waste stream; and directing the uranium waste stream to the column effluent
tank along the strip waste pathway.

* * * * *